Figure 1:
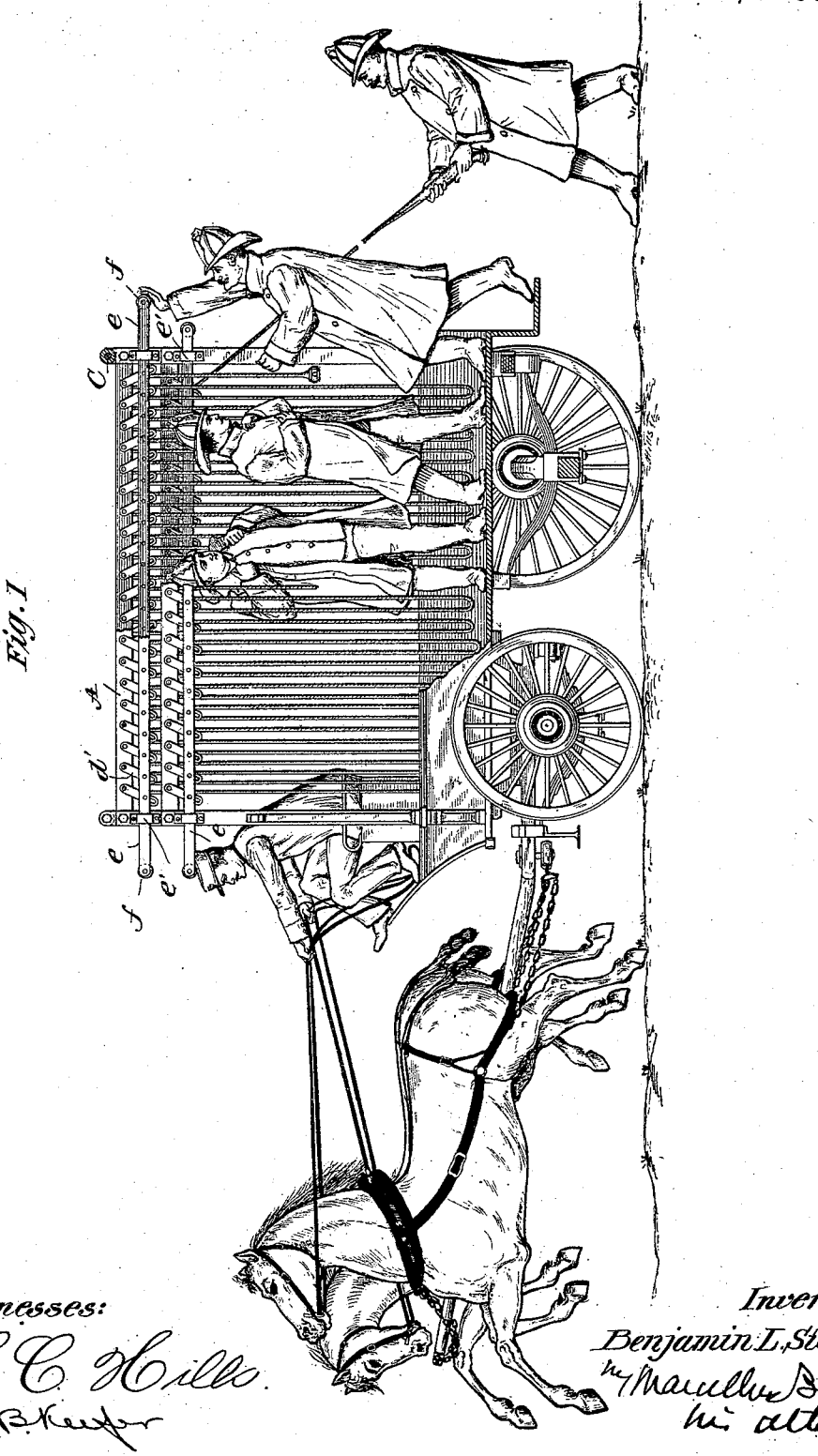

(No Model.) 4 Sheets—Sheet 2.

B. L. STOWE.
HOSE RACK.

No. 532,431. Patented Jan. 8, 1895.

Witnesses:
L. C. Hills

Inventor
Benjamin L. Stowe,
his Atty.

(No Model.) 4 Sheets—Sheet 3.

B. L. STOWE.
HOSE RACK.

No. 532,431. Patented Jan. 8, 1895.

Witnesses:
L. C. Hills.

Inventor
Benjamin L. Stowe
by Marcellus Bailey
his Atty.

THE NORRIS PETERS CO., PHOTO-LITHO., WASHINGTON, D. C.

(No Model.) 4 Sheets—Sheet 4.
B. L. STOWE.
HOSE RACK.

No. 532,431. Patented Jan. 8, 1895.

Witnesses:
L. C. Hills

Inventor:
Benjamin L. Stowe
by Marcellus Bailey
his Atty.

UNITED STATES PATENT OFFICE.

BENJAMIN L. STOWE, OF JERSEY CITY, NEW JERSEY.

HOSE-RACK.

SPECIFICATION forming part of Letters Patent No. 532,431, dated January 8, 1895.

Application filed September 11, 1894. Serial No. 522,738. (No model.)

*To all whom it may concern:*

Be it known that I, BENJAMIN L. STOWE, of Jersey City, in the county of Hudson and State of New Jersey, have invented certain new and useful Improvements in Hose-Racks, of which the following is a specification.

My present invention is an improvement upon a hose rack, of the general type which is the subject of my prior application for Letters Patent, filed June 7, 1894, Serial No. 513,821—that is to say, a hose rack having a series of lugs or ears which uphold hose supporting pins extending horizontally and crosswise of the rack, and movable outwardly so as to yield to any outward pull upon the loops of hose held by them, and in so doing, to release the hose. In one of the embodiments of my invention, illustrated in said application, the horizontal cross pins are hinged to turn upon a vertical axis; and each pin is in effect composed of two sections hinged, the one to the one lug and the other to the other lug of the pair between which as a whole the pin extends.

My invention has relation to a rack of the character last mentioned.

The particular object I have in view is that after the bights or loops of hose have been hung on the pins, they may be there securely held until occasion arises for drawing them off. This result I attain by swiveling the pin supporting lug itself so that it will turn upon a horizontal axis—the axes of the two lugs of each pair being in line with each other. In this way I may turn the lugs so that the axes of their pins will be vertical, in which case the pins will swing horizontally and outwardly to allow the loops of hose to be drawn from them; or on the other hand, I may turn the lugs so that the axes of their pins will be horizontal, in which case the pins will swing in a vertical plane, and upwardly only. In the latter case, the weight of the loops of hose resting on the pins will hold them down and prevent them from being jolted up far enough to release the loops. This arrangement is convenient also in that it permits the loops to be put on the pins, by pushing up the pins with the solid end of the loop, until the loop has passed above the pins, after which the latter will automatically drop back and return to a position in which they will support and hold the loop.

The foregoing and other features of my invention will readily be understood by reference to the accompanying drawings, in which—

Figure 2:
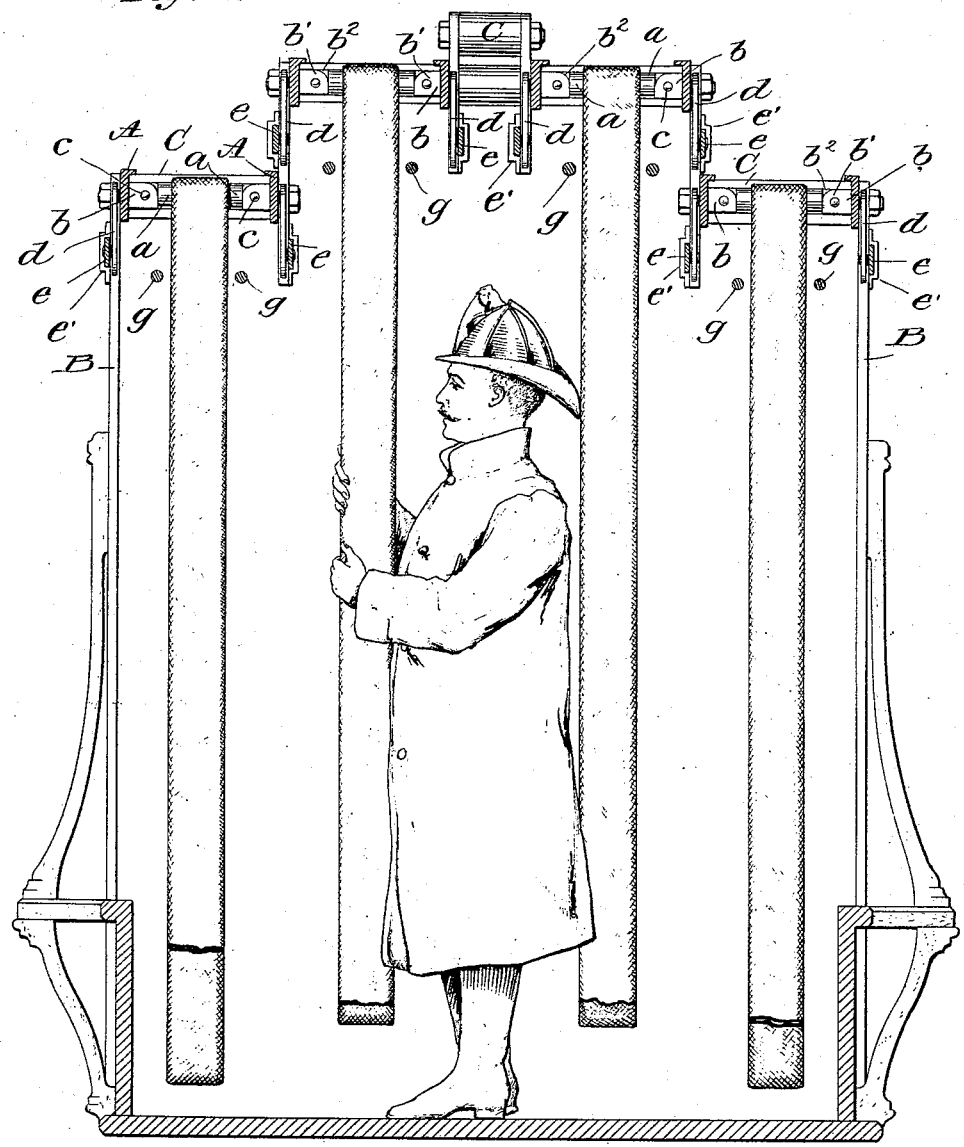
Figure 3:
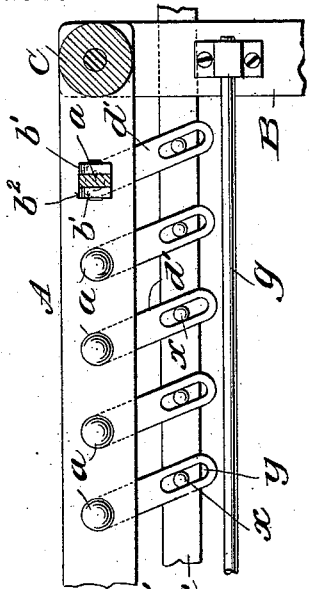
Figure 4:
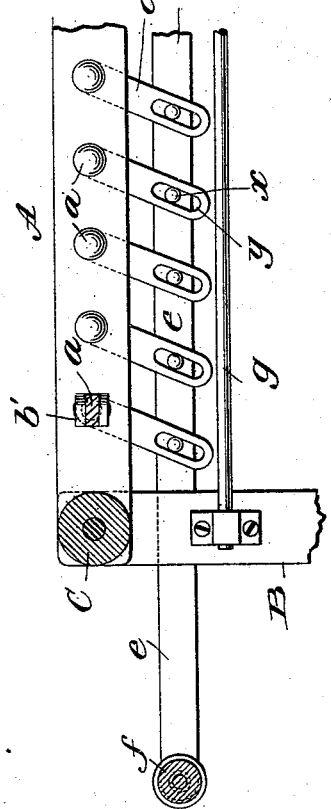
Figure 5:
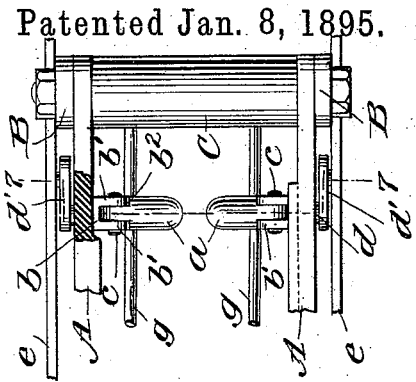
Figure 7:
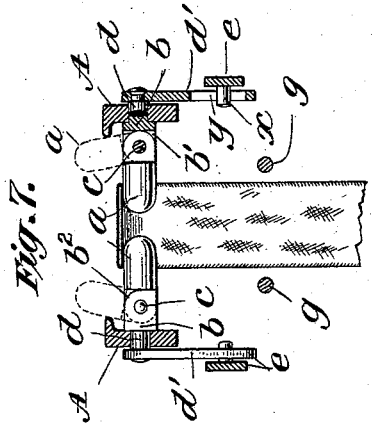
Figure 6:
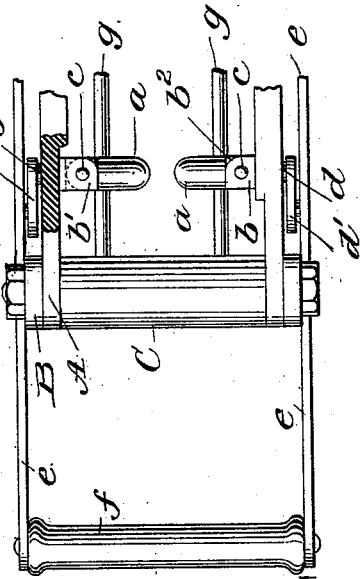
Figure 8:
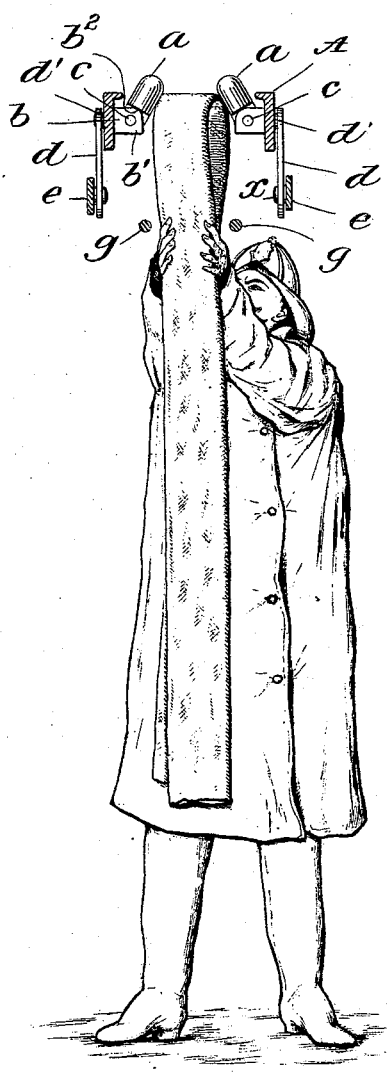

Figure 1 is a side elevation of a hose wagon embodying my invention. Fig. 2 is a vertical cross section of the body of the wagon on enlarged scale and so modified as to permit the crew of the wagon or some of them, to stand in between the rows of hose loops. Fig. 3 is a longitudinal sectional elevation of the inner face of a portion of one side of the frame which carries one series of swiveled lugs and pins pivoted thereto—the parts being in the position they occupy when the lugs are turned to bring the axes of the pin to horizontal position. Fig. 4 is a similar view of the other end of said frame with the parts in the position they occupy when the lugs are turned to bring the axes of the pins to vertical position. Fig. 5 is a sectional plan of Fig. 3; and Fig. 6 is a sectional plan of Fig. 4. Fig. 7 is a cross section on line 7—7, Fig. 5. Fig. 8 is a view of the rack similar to that in Fig. 7, illustrating the manner in which the loops of hose can be hung up and engaged with their supporting pins.

In the hose wagon shown in the drawings, there are four hose racks. Each hose rack consists of a frame comprising essentially longitudinal parallel stringers A, and vertical end pieces B, together with such spacing and staying bolts C and similar devices, as are needed to give stability to the structure. In the rack, each loop of hose is supported by two pins $a$ placed in line with each other end to end, having their outer ends fitted between the ears $b'$ of lugs $b$, each pin being pivoted to its lug by a joint-pin $c$. Each lug $b$ is swiveled to its supporting stringer A upon a horizontal axis $d$ consisting of an axle which projects through to the outside of the stringer. The arrangement of the parts is such that the pins swing on axes which are substantially parallel with each other and at right angles to the axis of oscillation of the lugs. The pairs of lugs are arranged lengthwise of their stringers at proper intervals apart. Their pins are so arranged that they swing only to one side of the line in which they stand when placed end to end. For this purpose the ears $b'$ of lugs $b$ have one corner $b^2$ rounded, this being the corner which is uppermost when the axes of the pins are horizontal, and the rounding being sufficient to allow the pins of each pair to swing up and back away from each other, as indicated by dotted lines in Fig. 7. The other corner of the ear is square and against it abuts the lower square shoulder on the pin which thus is held from going below horizontal position. With the parts in this position it is a simple operation to put a loop of hose in place and hang it upon its pins. The operation is illustrated in Fig. 8 and requires no further explanation. With the loop thus placed, it will be seen that it will hold its place without any difficulty (assuming, of course that the lugs $b$ are kept in their position). The only direction in which the pins can move is upward, and by the weight of the hose which they support they are restrained from any appreciable movement in that direction, even if the hose carriage on which the rack is, be in rapid motion; but it will also be noted that the moment the swiveled lugs are turned from this position to one in which the axes of the pins are vertical—as in Figs. 4 and 6—then the pins will be free to yield to any pull on them tending to move them in the one direction in which they can swing outwardly and away from each other. A hose wagon provided with a rack thus arranged—whether the particular rack in question or not—is not here claimed, the same being the subject of another application for Letters Patent in my name filed September 14, 1894, Serial No. 522,962, on which Letters Patent will issue of even date therewith.

It is desirable, in some instances, that the pin supporting lugs of each rack should be adjusted or turned simultaneously and together. Various means for this purpose may be employed and will suggest themselves to the skilled mechanic. I prefer to provide each lug with a crank arm $d'$ fixed on the outer end of each lug axle $d$ and united by a pin and slot connection $x$ $y$ to horizontal longitudinally movable bars $e$ supported in end guides $e'$ in which they can slide, the two bars $e$ required for the two opposite sets of lugs of each rack, being united together at each end by a cross bar $f$ which serves as a handle. The bars $e$ $f$ form in effect, a rectangular sliding frame; and by pushing this frame in one direction or the other, the lugs $b$ will be turned accordingly. The lugs require to make only a quarter revolution and the throw of the adjusting frame is of course correspondingly limited. Longitudinal guide rods $g$ secured to the vertical end posts B are provided to prevent any loops from slipping sidewise over upon either one of the lugs $b$ of its supporting pins.

In some cases I may use only one pin for each hose loop the pin being of sufficient length to take the loop; but I prefer the two pin arrangement illustrated in the drawings.

Having described my invention and the manner in which the same is or may be carried into effect, what I claim, and desire to secure by Letters Patent, is—

1. In a hose rack, the combination with a swiveled supporting lug, of a hose supporting pin hinged to said lug upon an axis at right angles to that upon which the lug can turn, substantially as hereinbefore set forth.

2. In a hose-rack, the combination of two oppositely placed swiveled lugs with pins, one for each lug, jointed to their lugs upon axes substantially parallel with each other, but at right angles to the axis of oscillation of the lugs, substantially as and for the purposes hereinbefore set forth.

3. In a hose rack, the combination of a series of swiveled lugs, a series of hose supporting pins hinged to said lugs upon axes at right angles with those of the lugs, and means for adjusting or oscillating the lugs simultaneously and together, substantially as and for the purposes hereinbefore set forth.

4. The combination of a supporting frame, a series of lugs swiveled therein, a series of pins hinged to said lugs upon axes at right angles with those of the lugs, crank arms attached to the axles of said lugs, and a sliding adjuster connected to and adapted to operate simultaneously all of said crank arms, substantially as and for the purposes hereinbefore set forth.

In testimony whereof I have hereunto affixed my signature in the presence of two witnesses.

BENJAMIN L. STOWE.

Witnesses:
EVELYN NORRIS,
FRANK R. GRADY.